US006651508B2

(12) United States Patent
Baba et al.

(10) Patent No.: US 6,651,508 B2
(45) Date of Patent: Nov. 25, 2003

(54) PRESSURE SENSOR HAVING SEMICONDUCTOR SENSOR CHIP

(75) Inventors: Hironobu Baba, Obu (JP); Yukihiro Kato, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/953,880

(22) Filed: Sep. 18, 2001

(65) Prior Publication Data

US 2002/0062698 A1 May 30, 2002

(30) Foreign Application Priority Data

Nov. 27, 2000 (JP) ........................................ 2000-359838
Feb. 21, 2001 (JP) ........................................ 2001-45293

(51) Int. Cl.[7] ............................................... G01L 9/16
(52) U.S. Cl. ............................... 73/754; 73/700; 73/753
(58) Field of Search ......................... 73/754, 727, 756, 73/721, 708, 726

(56) References Cited

U.S. PATENT DOCUMENTS

| 5,112,142 A | * | 5/1992 | Titcomb et al. ............. 384/107 |
| 5,595,939 A | * | 1/1997 | Otake et al. .................. 73/756 |
| 5,747,694 A | | 5/1998 | Baba et al. |

FOREIGN PATENT DOCUMENTS

| JP | 62-226031 | 10/1987 |
| JP | 63-175736 | 7/1988 |
| JP | 2-136727 | 5/1990 |
| JP | 3-123833 | 5/1991 |
| JP | 3-237332 | 10/1991 |
| JP | 5-145085 | 6/1993 |
| JP | 10-170381 | 6/1998 |
| JP | 10-206264 | 8/1998 |
| JP | 11-64145 | 3/1999 |
| JP | 11-241970 | 9/1999 |

OTHER PUBLICATIONS

U.S. patent application Ser. No. 09/417,301, Watanabe et al., filed Oct. 13, 1999.

* cited by examiner

Primary Examiner—Edward Lefkowitz
Assistant Examiner—Alandra Ellington
(74) Attorney, Agent, or Firm—Posz & Bethards, PLC

(57) ABSTRACT

A semiconductor sensor chip includes a thin diaphragm and an electrical circuit formed on a front surface of the diaphragm. The diaphragm distorts according to a pressure difference between pressures applied on both surfaces of the diaphragm, and the diaphragm distortion is converted into an electrical signal. Both surfaces of the diaphragm are covered with protecting members to protect the sensor chip from dusts and moisture contained in the gas. Since the gas is introduced to the rear surface of the diaphragm through a small passage while the front surface receives pressure with a relatively large area, the protecting member covering the rear surface is made softer than that covering the front surface. Thus, the sensor chip is properly protected against dusts and moisture.

12 Claims, 5 Drawing Sheets

| H \ θ | 15° | 30° | 45° |
|---|---|---|---|
| 2mm | ×: RESIDUAL WATER ON SENSOR CHIP | △: RESIDUAL WATER AT CASE CORNER | ○: RESIDUAL WATER AT CASE CORNER (VERY LITTLE) |
| 4mm | ×: RESIDUAL WATER ON SENSOR CHIP | ○: RESIDUAL WATER AT TAPER CORNER | ○: RESIDUAL WATER ON CASE WALL (SMALL DROPLETS) |
| 6mm | △: RESIDUAL WATER AT CASE CORNER | ○: RESIDUAL WATER AT TAPER CORNER | ○: RESIDUAL WATER ON CASE WALL (SMALL DROPLETS) |

PRESSURE SENSOR HAVING SEMICONDUCTOR SENSOR CHIP

CROSS-REFERENCE TO RELATED APPLICATION

This application is based upon and claims benefit of priority of Japanese Patent Applications No. 2000-359838 filed on Nov. 27, 2000 and No. 2001-45293 filed on Feb. 21, 2001, the contents of which are incorporated herein by reference.

BACKGROUND OF THE INVENTION

1. Field of the Invention

The present invention relates to a pressure sensor detecting a pressure difference imposed on both surfaces of a semiconductor sensor chip.

2. Description of Related Art

Examples of pressure sensors of this kind are disclosed in JP-A-9-43085, JP-A-3-237332 and JP-A-11-241970. A conventional pressure sensor disclosed in those publications includes a semiconductor diaphragm-type sensor chip mounted on a case. A first pressure is imposed on a front surface of the sensor chip and a second pressure is imposed on its rear surface, and a pressure difference between the first and the second pressures is detected as an electrical signal. An electrical circuit for converting the pressure difference into the electrical signal is formed on the front surface of the sensor chip, and the rear surface of the sensor chip is pasted on the sensor case via a substrate.

The front surface of the sensor chip on which the electrical circuit is formed is covered with a protecting member made of rubber, gel or the like to protect the electrical circuit from dust or moisture. The rear surface of the sensor chip, however, is not covered. A rear passage introducing the second pressure onto the rear surface of the sensor chip is considerably narrow, compared with a front passage introducing the first pressure onto the front surface. This is because the rear surface of the sensor chip has to be pasted on the sensor case. The narrow rear passage tends to become clogged with foreign particles including dust and moisture when the pressure sensor is used in a non-ideal operating environment because the rear passage is not protected from the environment. The sensor case may be damaged by the condensed moisture in the worst case. If the rear passage is clogged with foreign particles, the pressure sensor does not function correctly.

SUMMARY OF THE INVENTION

The present invention has been made in view of the above-mentioned problem, and an object of the present invention is to provide an improved pressure sensor which accurately detects the pressure difference between pressures imposed on both surfaces of the sensor chip even when the pressure sensor is used in a bad atmosphere.

A semiconductor sensor chip having a front surface and a rear surface is mounted on and contained in a case. The case includes a first passage through which a first pressure is introduced and a second passage through which a second pressure is introduced. The first pressure is supplied to the front surface of the sensor chip, while the second pressure is supplied to the rear surface. A pressure difference between the first and second pressures is detected by the sensor chip and converted into an electrical signal. The pressure sensor is used, for example, as a sensor for detecting mesh-clogging of a diesel particulate filter.

A thin diaphragm is formed on the front surface of the sensor chip by making a cavity from the rear surface. The diaphragm distorts according to the pressure difference between the first and second pressures, and the distortion is converted into an electrical signal. The sensor chip is mounted on the case via a substrate connected to the rear surface of the sensor chip. The second pressure is supplied to the diaphragm of the sensor chip through a small through-hole formed in the substrate.

The front surface of the sensor chip is covered with a first protecting member to protect the sensor chip from foreign particles such as dusts and moisture contained in the gas such as exhaust gas. The rear surface of the sensor chip is also covered with a second protecting member to protect the sensor chip against the foreign particles. The small through-hole formed in the substrate is connected to a rear passage that includes a pressure passage having a relatively small cross-sectional area and a depressed portion having a large cross-sectional area. The second protecting member fills both of the small through-hole formed in the substrate and the rear passage. The second pressure is first received by a large area of the second protecting member filling the depressed portion and then transferred to the rear surface of the sensor chip through the second protecting member filling the rear passage and the small through-hole. In this manner, the rear surface of the sensor chip is protected without fail from the moisture or the dusts contained in the gas.

The first and the second protecting members are composed of a host material such as phlorosilicone gel or fluorine gel and oil added to the host material. Preferably, the oil of the same type as the host material is added to the host material. Since the second protecting member fills the small through-hole while the first protecting member covers a relatively large area, more oil is added to the second protecting member than to the first protecting member to make the second protecting member softer. For example, oil in an amount of more than 30 percents of the host material is added to the second protecting member.

Either one of the first gas introducing passage or the second gas introducing passage may be made in a funnel shape extending in a direction perpendicular to the surface of the sensor chip. Moisture condensed in the gas introducing passage can be easily discharged along a tapered wall of the funnel-shaped passage. The taper angle of the tapered wall relative to the sensor chip surface is made larger than 30 degrees, preferably, larger than 45 degrees.

According to the present invention, the rear surface of the sensor chip is protected by the second protecting member in addition to protecting the front surface by the first protecting member. Therefore, the sensor chip is surely protected against dusts and moisture contained in the gas introduced in the sensor case, and thereby the pressure sensor accurately detects the pressure supplied thereto.

Other objects and features of the present invention will become more readily apparent from a better understanding of the preferred embodiments described below with reference to the following drawings.

Figure 1:
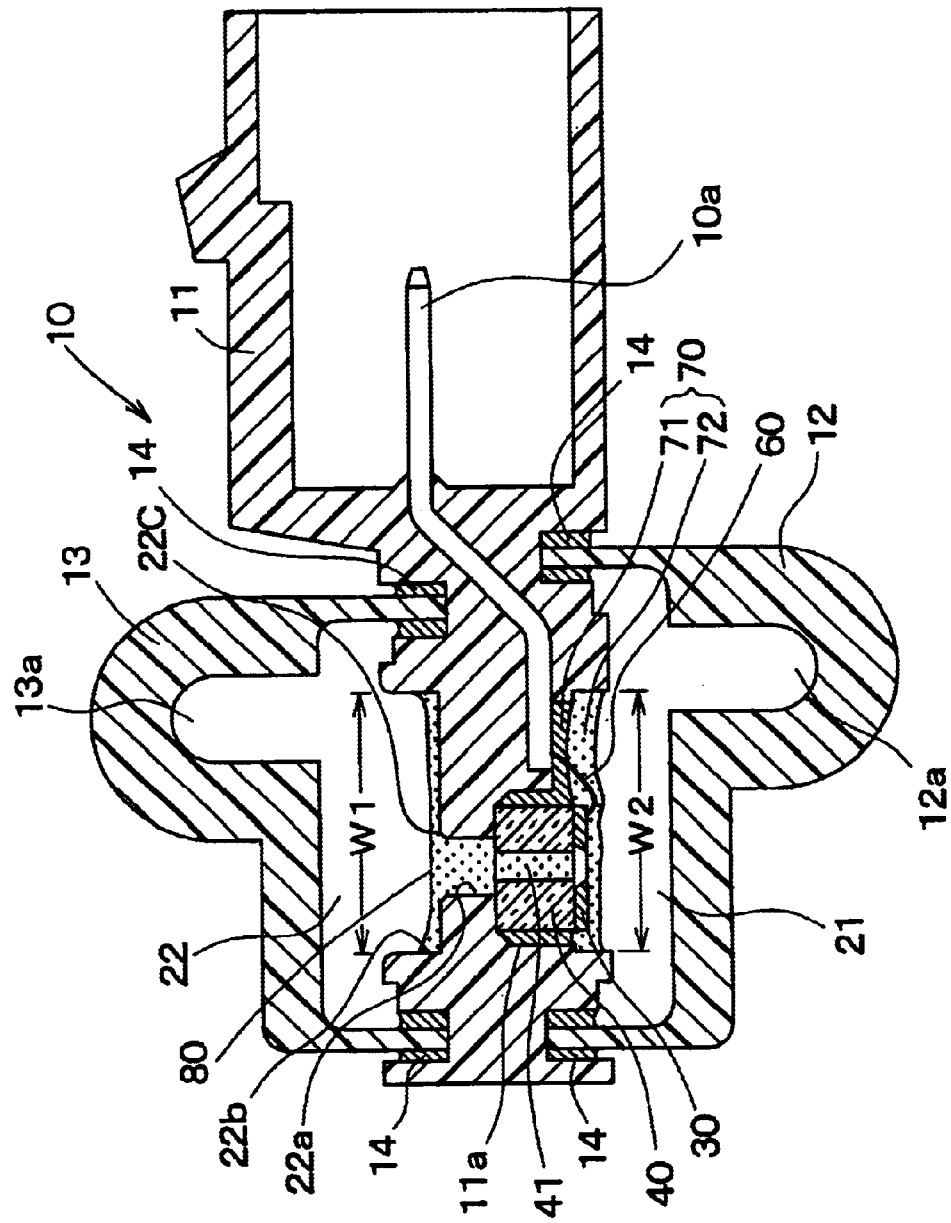
FIG. 1 is a cross-sectional view showing a pressure sensor as a first embodiment of the present invention.

DETAILED DESCRIPTION OF THE PREFERRED EMBODIMENTS (First Embodiment)

A first embodiment of the present invention will be described with reference to FIGS. 1–3. First, referring to FIGS. 1 and 2, the structure of a pressure sensor as a first embodiment will be described. The pressure sensor shown here may be used for detecting mesh clogging in a diesel particulate filter (referred to as a DPF). In this case, the pressure sensor is installed on an exhaust pipe of a diesel engine to measure a pressure difference between an upstream position and a downstream position of the DPF.

A case 10, in which a sensor chip 30 is mounted, is composed of a connector case 11, a first pressure port case 12 and a second pressure port case 13. The connector case 11, the first pressure port case 12 and the second pressure port case 13 are separately formed by molding resin such as polybutylane-terephthalate (PBT) or polyphenylene-sulfide (PPS). Both pressure port cases 12, 13 are connected to the connector case 11 by adhesive 14 after the sensor chip 30 is mounted on the connector case 11. A terminal pin 10a is insert-molded in the connector case 11. A hole 11a for mounting the sensor chip 30 is formed on the connector case 11. The sensor chip 30 mounted on the connector case 11 separates a first pressure introducing passage 21 and a second pressure introducing passage 22 both formed in the case 10.

Figure 2:
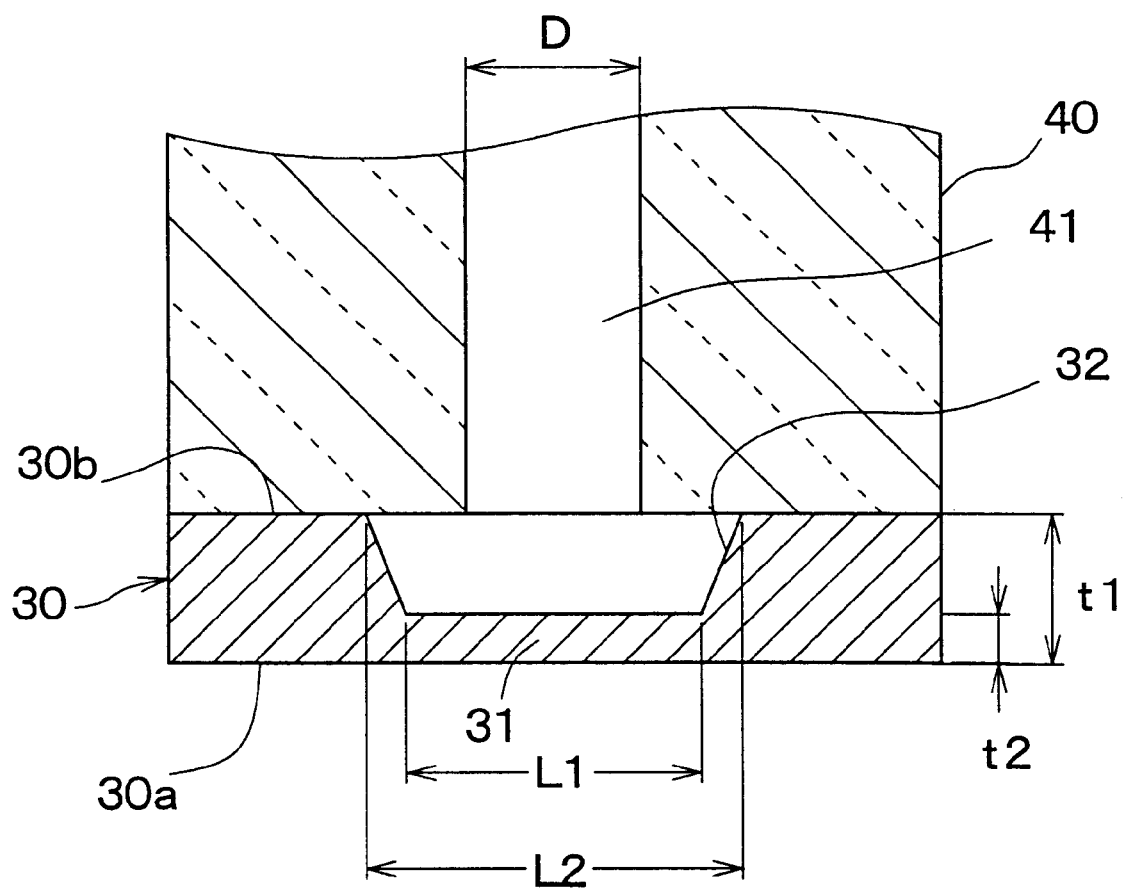
FIG. 2 is a partial cross-sectional view showing a sensor chip mounted on the pressure sensor shown in FIG. 1.

FIG. 2 shows a cross-sectional view of the sensor chip 30 in an enlarged scale. The sensor chip 30 is made of a semiconductor substrate such as a silicon substrate. A cavity 32 is formed on a rear surface 30b of the sensor chip 30, thereby forming a thin diaphragm 31 on its front surface 30a. The cavity 32 is formed by known anisotropic etching. A substrate 40 made of glass or the like is attached on the rear surface 30b of the sensor chip 30, and both are integrally connected. The substrate 40 is pasted on the bottom surface of the hole 11a formed on the connector case 11 by adhesive such as phlorosilicone-type adhesive (not shown). A through-hole 41 is formed in the substrate 40 to introduce a second pressure to the sensor chip 30. The diameter D of the through-hole is made smaller than an opening of the cavity 32.

A first pressure is imposed on the front surface 30a of the sensor chip 30 through a first pressure port 12a and the first pressure introducing passage 21. A second pressure is imposed on the rear surface 30b of the sensor chip 30 through a second pressure port 13a, the second pressure introducing passage 22 and the through-hole 41. The first pressure introducing passage 21 is separated from the second pressure introducing passage 22 by the sensor chip 30. The first pressure port 12a is connected to a downstream position of the DPF through a rubber hose or the like (not shown), while the second pressure port 13a is similarly connected to an upstream position of the DPF. Thus, the DPF downstream pressure (the first pressure) is applied to the front surface 30a of the sensor chip 30, and the DPF upstream pressure (the second pressure) is applied to the rear surface 30b of the sensor chip 30. A difference of the first and second pressures is detected by sensor chip 30.

Referring to FIG. 2, exemplary dimensions of the sensor chip 30 and the through-hole 41 will be shown. Thickness t1 of the sensor chip 30 is about 200 μm. The diaphragm 31 is made in a square shape of 1.4 mm×1.4 mm (L1=1.4 mm), and the thickness t2 thereof is about 30 μm. The opening of the cavity 32 may be made in an octagon shape having a side length of about 1.9–2.0 mm (L2=1.9–2.0 mm). Diameter D of the through-hole 41 is 0.8–0.9 mm, which is smaller than the cavity opening.

On the front surface 30a of the sensor chip 30, an electrical circuit for converting the pressure signal to an electrical signal is formed (not shown). The electrical circuit is electrically connected to the terminal pin 10a through a gold or aluminum wire 60 formed by wire-bonding, as shown in FIG. 1. One end of the terminal pin 10a extends outwardly and is connectable to an outside circuit such as an on-board electronic control unit (not shown).

A first protecting member 70 is disposed to cover the front surface side of the sensor chip 30, and a second protecting member 80 is disposed to cover the rear surface side of the sensor chip 30. The second protecting member 80 serves to prevent foreign particles from entering into the through-hole 41. A depressed portion formed on the connector case 11 at the front surface side is filled with the first protecting member 70, as shown in FIG. 1. The first protecting member 70 covers the front surface 30a, the wire 60 and a portion connecting the wire to the terminal pin 10a to protect those parts. The first protecting member 70 is composed of a first layer 71 made of resin having a relatively high Young's modulus and a second layer 72 made of resin having a relatively low Young's modulus. More particularly, a double layer structure shown in JP-A-11-304619 may be used as the first protecting member 70. Such double layer structure provides a good protecting member in which bubble generation is properly prevented.

A pressure passage 22a and a depressed portion 22b having an opening wider than the pressure passage 22a are formed in the connector case 11 at the rear surface side of the sensor chip 30, as shown in FIG. 1. A step 22c is formed at a boundary of the pressure passage 22a and the depressed portion 22b. The second protecting member 80 fills the through-hole 41, the pressure passage 22a and the depressed portion 22b, as shown in FIG. 1. Opening W1 of the depressed portion 22b is made more than two times larger than the pressure passage 22a. The opening W1 is covered with the second protecting member 80 which receives the second pressure thereon. Therefore, the second pressure can be received by a wider area, and protection against foreign particles can be enhanced.

The second protecting member 80 is a single layer made of a gel material which is hardened by heat. Phlorosilicone gel or fluorine gel is preferable because of its higher stability against chemicals. If silicone-type gel is used, it may be swollen by moisture contained in the exhaust gas. Oil is added to the materials forming both the first and the second protecting members 70, 80. However, more oil is added to the second protecting member 80 than to the first protecting member 70. For example, phlorosilicone oil is added to the phlorosilicone gel as a host material of the second protecting member 80. Preferably, oil in excess of 30% of the host material is added thereto.

The manufacturing process of the pressure sensor described above will be briefly described. The sensor chip 30 connected to the substrate 40 is pasted to the connector case 11 with adhesive. Then, the sensor chip 30 and the terminal pin 10a are electrically connected through the wire 60 by wire-bonding. Then, the first protecting member 70 is disposed to cover the front surface side of the sensor chip 30 in the following manner. The first layer 71 (resin such as fluorine rubber) is supplied into the hole 11a to fill up a space between the substrate 40 and the hole 11a. The first layer 71 is supplied up to the level of the rear surface 30b of the sensor chip 30, as shown in FIG. 1. Bubbles in the first layer 71 are removed under vacuum. The second layer 72 (resin such as fluorine gel) is disposed to cover the first layer 71 and to fill the depressed portion formed on the connector case 11 at the front surface side, as shown in FIG. 1. Then, both the first and the second layers 71, 72 are simultaneously hardened under heat. The first pressure port case 12 is fixed to the connector housing 11 with adhesive 14. Thus, the first pressure introducing passage 21 is formed.

Then, the second protecting member 80 is disposed at the rear surface side of the sensor chip 30 as shown in FIG. 1 in the following manner. A material, such as phlorosilicone gel as a host material to which phlorosilicone oil is added in an amount of 30–35% of the host material, is supplied to fill the through-hole 41, the pressure passage 22a and a part of the depressed portion 22b under vacuum. Alternatively, the material is supplied under the atmospheric pressure and then bubbles in the material are removed under vacuum. As the material forming the second protecting member, fluorine gel and fluorine oil may be used in place of the phlorosilicone gel and the phlorosilicone oil. Then, the gel material is hardened under heat, thus completing the second protecting member 80. Then, the second pressure port case 13 is connected to the connector case 11 with adhesive 14. Thus, the second pressure introducing passage 22 is formed.

The pressure sensor operates in the following manner when it is used as a sensor for measuring a difference between the upstream and downstream pressures of the DPF to detect the DPF mesh clogging. The downstream pressure as the first pressure is introduced into the case 10 through the first pressure port 12a, while the upstream pressure as the second pressure is introduced into the case through the second pressure port 13a. The first pressure is imposed on the surface of the first protecting member 70 through the first pressure introducing passage 21 and transferred to the front surface of the diaphragm 31. At the same time, the second pressure is imposed on the surface of the second protecting member 80 through the second pressure introducing passage 21 and transferred to the rear surface of the diaphragm 31. The diaphragm 31 distorts according to the pressure difference between the first and second pressures. The diaphragm distortion is converted into an electrical signal by the circuit formed on the front surface 30a of the sensor chip 30. The electrical signal representing the pressure difference is outputted from the sensor chip 30 to the outside circuit through the wire 60 and the terminal pin 10a.

In the conventional pressure sensor which detects a pressure difference between pressures supplied to both surfaces of the sensor chip, only the front surface of the sensor chip is covered and protected against foreign particles. The present invention provides the second protecting member 80 covering the rear surface of the sensor chip 30 in addition to the first protecting member covering the front surface. Therefore, the foreign particles such as dusts and moisture are prevented from entering into the through-hole 41 and the pressure passage 22a through the second pressure introducing passage 22. Accordingly, the pressure sensor of the present invention is able to accurately measure the pressure difference. Especially, when the pressure sensor is installed in the exhaust pipe, moisture included in the exhaust gas which is not able to be removed by a filter enters into the narrow through-hole 41, if the through-hole 41 is not protected by the second protecting member 80. If the moisture enters the narrow passage, it may be condensed in the passage, and further it may be frozen therein. Such moisture is prevented from entering into the narrow pressure passage by the second protecting member 80.

Since the rear surface of the sensor chip 30 has to be pasted to the substrate 40, the size of the through-hole 41 cannot be made large. For example, the diameter D of the through-hole is about 0.8–0.9 mm in the first embodiment. The through-hole 41 having such a small size may be clogged with the condensed or frozen moisture if it is not protected by the second protecting member 80.

The hardness of the material constituting the second protecting member 80 must be properly set. If it is too hard, zero-point deviation of the sensor output (this will be explained later in detail) becomes large due to shrinkage heat generated in the material when the material is hardened in the narrow passage, because the stress generated in the narrow passage is difficult to be released. On the other hand, if it is too soft, the second protecting member 80 will flow out or will be removed from the narrow passage by heat cycles or vibration during actual use. The hardness can be controlled by changing an amount of oil added to the material constituting the second protecting member 80.

Experiments have been conducted to determine the amount of oil to be added to the material constituting the second protecting member 80. As the first protecting member 70, a material such as phlorosilicone gel or fluorine gel containing several percents of oil is properly usable. As the second protecting member 80, however, elasticity modulus of such material is too high, and the zero-point deviation of the sensor output becomes high due to the shrinkage heat generated by hardening. In the experiments, oil of the same kind as the host material is added to the host material, i.e., phlorosilicone oil is added to phlorosilicone gel, and fluorine oil is added to the fluorine gel. The amount of oil added to the host material has to be sufficient to soften the host material in a range not hinder the hardening of the host material under heat.

Figure 3:
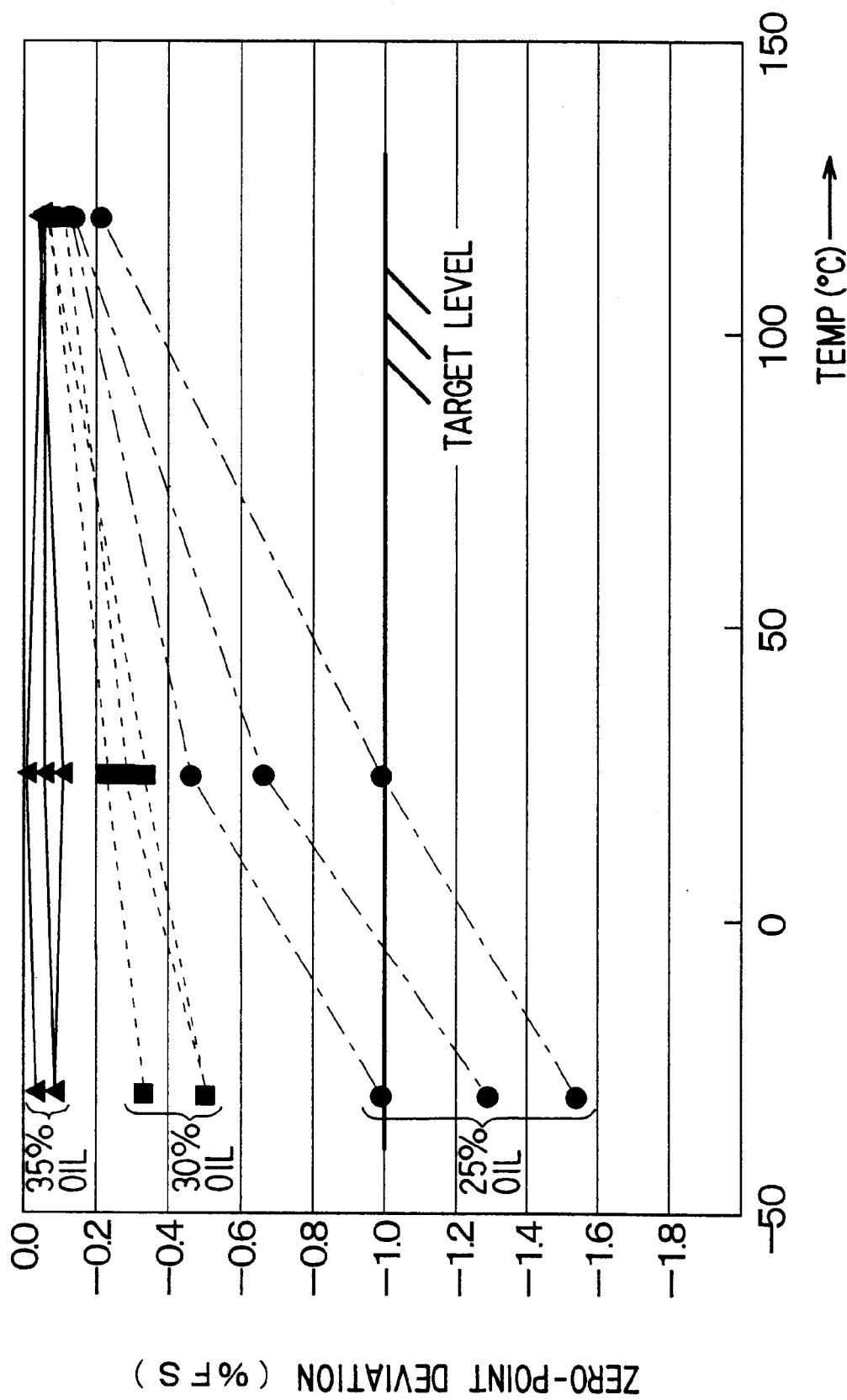
FIG. 3 is a graph showing a relation between a zero-point deviation of a sensor output and temperature at which the pressure sensor is used, an amount of oil contained in a second protecting member being taken as a parameter.

FIG. 3 shows results of the experiments in which phlorosilicone oil is added to a host material phlorosilicone gel in an amount of 25%, 30% or 35% (an oil percentage relative to the host material). The zero-point deviation in percents of a full scale of the sensor output (%FS) is shown on the ordinate and temperature at which the pressure sensor is used is shown on the abscissa. The zero-point deviation is defined as (S2-S1), where S1 is a sensor output voltage measured when the same pressure is applied to the front surface 30a and the rear surface 30b of the sensor chip 30 under the condition that only the first protecting member 70 is installed (the second protecting member 80 is not yet installed), and S2 is a sensor output voltage measured when the same pressure is applied to both surfaces under the condition that both protecting members 70, 80 are installed (the second protecting material is supplied and hardened). A target level of the zero-point deviation in percents of the sensor output full scale (%FS) is 1.0% in its absolute value. This target level is set based on a requirement in the actual use.

As seen in the graph shown in FIG. 3, the target level is cleared when the oil is added to the host material in the amount more than 30% of the host material. On the other hand, other experiments show that the hardening is hindered when the oil is added in excess of 40%. Accordingly, it is preferable the amount of oil added to the host material does not exceed 40%. The most suitable amount of oil depends on the host material. It is important, however, to add more oil to the second protecting member 80 than to the first protecting member 70. In this manner, the zero-point deviation can be suppressed within the target level, and the sensor can accurately detect the pressure difference applied to both surfaces of the sensor chip 30.

As shown in FIG. 1, the second protecting member 80 is disposed not only in the through-hole 41 but also in the space constituted by the pressure passage 22a and the depressed portion 22b. The opening W1 of the depressed portion is made more than two times wider than that of the pressure passage 22a, thereby making the opening W1 comparable to the opening W2 at the side of the first pressure introducing passage 21. For example, both openings W1, W2 are made in a rectangular shape of 9 mm×12 mm. Since the opening W1 is made wide, the second pressure is received by a sufficiently wide surface, and thereby the pressure is stably transferred to the sensor chip 30 even when some foreign particles are attached on the surface of the second protecting member 80.

It is preferable to make elasticity modulus of the second protecting member 80 lower than that of the first protecting member 70. For example, the elasticity modulus of the first protecting member 80 is made comparable to that of the second layer 72 of the first protecting member 70 (e.g., lower than 60 Pa), or lower than that. This is because the stress generated in a narrow through-hole 41 is difficult to be released if it is filled with a hard material. The through-hole 41 cannot be made large because the rear surface 30b of the sensor chip 30 is pasted to the substrate 40, as mentioned above.

The first pressure port 12a and the second pressure port 13a do not directly face the sensor chip 30 but are positioned at offset positions relative to the sensor chip 30. Therefore, the gas stream does not directly hit the surface of the protecting members 70, 80. This structure helps decrease adherence of foreign particles on the protecting member surfaces.

(Second Embodiment)

Figure 4:
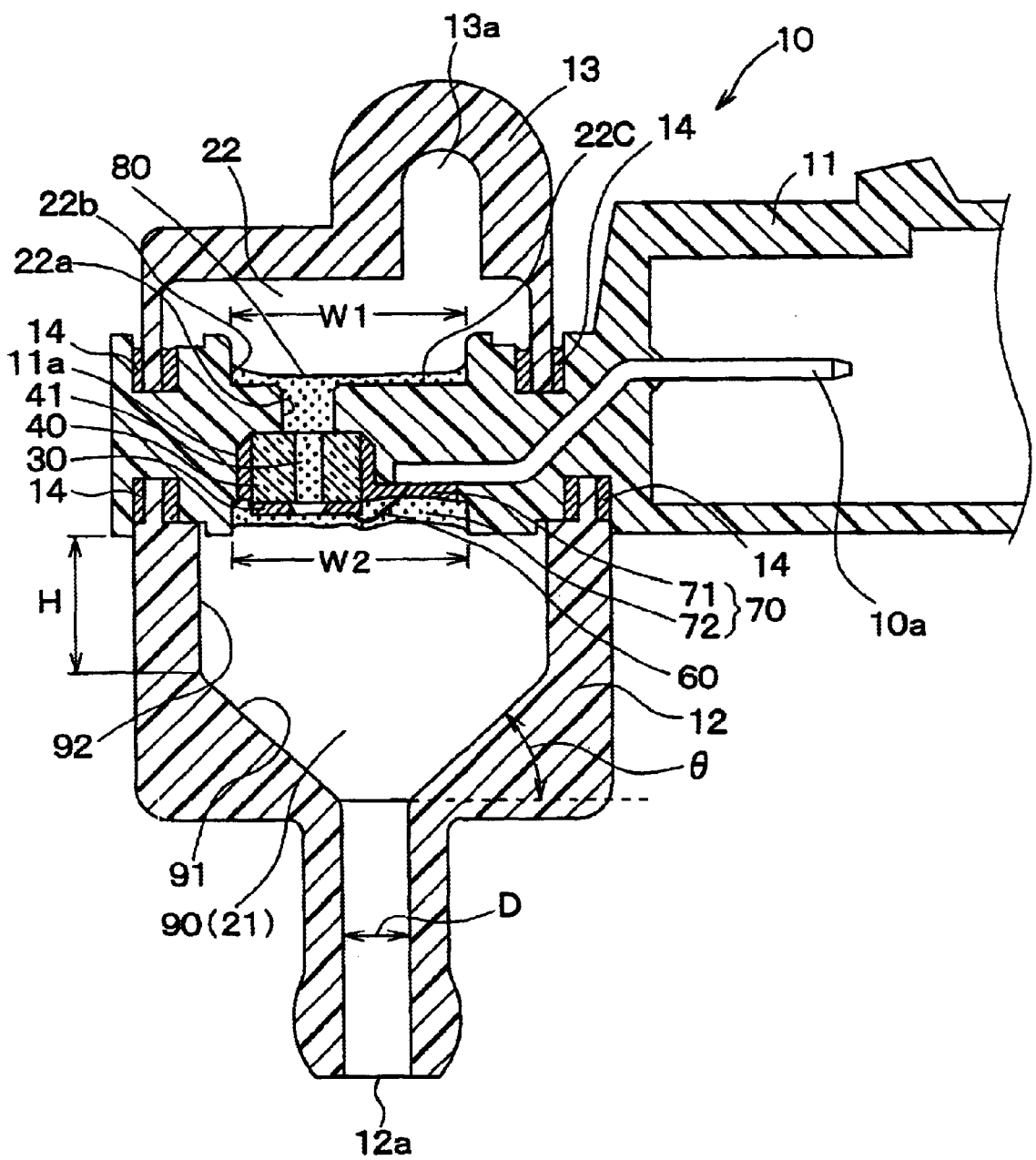
FIG. 4 is a cross-sectional view showing a pressure sensor as a second embodiment of the present invention.

A second embodiment of the present invention will be described with reference to FIG. 4. In this embodiment, the first pressure port case 12 of the first embodiment is modified to a funnel shape. Other structures are the same as those of the first embodiment. The same components or parts are numbered with the same reference numbers, and only the modified portions will be described below. As shown in FIG. 4, the first pressure port case 12 of the second embodiment extends downwardly from the first surface side of the sensor chip 30. The first pressure introducing passage 21 of the first embodiment is deformed into a vertical passage 90 that includes a rectangular space formed by straight wall 92 having height H and a tapered space formed by a tapered surface 91. The first pressure port 12a having diameter D is connected to the tapered space. In other words, the funnel-shaped first pressure port case 12 is disposed to extend perpendicularly to the first surface 30a of the sensor chip 30. The rectangular space and the round first pressure port 12a having the diameter D are connected by the tapered space.

This pressure sensor is installed in the exhaust pipe so that the axis of the fist pressure port 12a extends in the vertical direction. When water contained in the exhaust gas accumulates in the funnel-shaped passage, such water is discharged along the tapered surface 91 and through the first pressure port 12a. For this purpose, a taper angle θ, which is an angle made by a plane parallel to the sensor chip surface and the tapered surface 91, is made larger than 30 degrees (preferably larger than 45 degrees). The taper angle θ is determined by experiments described below.

Half a capacity of the vertical passage 90 is filled with water. The pressure sensor is positioned above an exhaust pipe of an engine so that the first pressure port 12a becomes vertical, and the first pressure port 12a is connected to the exhaust pipe through a rubber hose. Diameter D of the first pressure port 12a is made 4.5 mm which is predetermined as a sufficient size to discharge water. The first pressure port 12a is connected to the exhaust pipe through a rubber hose having a length of 114 cm. The engine is driven at 1,500 rpm for one minute, and then the amount of water remaining in the vertical passage 90 (residual water) is measured. Under the above conditions, test samples having the following dimensions are tested. Height H of the straight surface 92: 2, 4 and 6 mm, and taper angle θ: 15, 30 and 45 degrees.

Figures 5, 6:
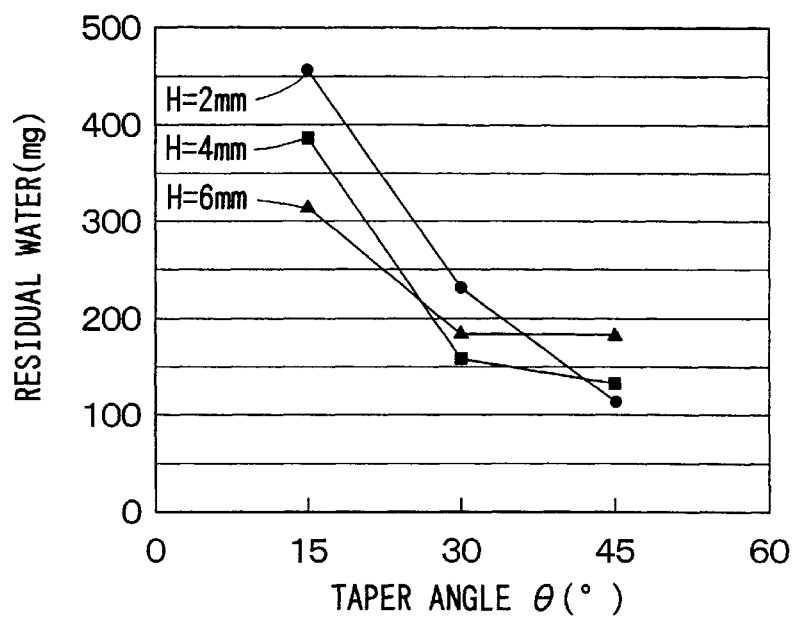
FIG. 5 is a graph showing test results which show an amount of residual water in a vertical passage relative to temperature.
FIG. 6 is a table showing conditions of residual water in the vertical passage having various dimensions.

The amount of residual water relative to the taper angle θ is shown in FIG. 5. In this graph, the height H is taken as a parameter. As seen in the graph, the larger the taper angle θ, the smaller the amount of residual water. The height H partially affects the amount of residual water.

FIG. 6 shows conditions of the residual water in the vertical passage 90 having respective dimensions H and θ, i.e, it shows at which portion the water remains, or what shape the remaining water is. The residual water conditions are observed after the tests. In the table of FIG. 6, marks ○, ×, and Δ mean the following situations, respectively. ○: Water is sufficiently discharged and the residual water does not affect substantial operation of the sensor chip 30, though a little water or droplets remain at a corner portion connecting the straight surface 92 and the tapered surface 91). Δ: Water is almost sufficiently discharged and there is almost no possibility that the residual water affects the sensor operation. ×: Water still remains on the surface of the first protecting member 70 and the residual water may affect the sensor operation, and therefore this is not permissible.

Based on the above test results, it can be concluded that the sensor operation is not substantially affected by the residual water if the taper angle θ is larger than 30 degrees, preferably, larger than 45 degrees. Though it is preferable that the taper angle θ is larger than 45 degrees, the taper angle θ has to be selected taking into consideration an actual size limitation of the pressure sensor.

Though in the second embodiment described above, the first pressure introducing passage 21 is formed in the shape of vertical passage 90, it is similarly possible to form the second pressure introducing passage 22 in the shape of vertical passage. The same advantage is obtained in this case, too.

Though the pressure sensors measuring a difference of the first and second pressures applied to both surfaces of the sensor chip 30 are described as the embodiments of the present invention, it is possible to apply the present invention to other pressure sensors that measure either one of the first or the second pressure by using the other pressure as a reference pressure such as atmospheric pressure. For example, present invention is applicable to the sensor disclosed in JP-A-9-43085.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A pressure sensor comprising:
   a case;
   a semiconductor sensor chip having a front and a rear surface, the semiconductor sensor chip being mounted on the case by connecting the rear surface to the case and measuring a difference between a first pressure applied to the front surface and a second pressure applied to the rear surface;

a first pressure introducing passage formed in the case, through which the first pressure is applied to the front surface; and a second pressure introducing passage formed in the case, through which the second pressure is applied to the rear surface, wherein:

the front surface is covered with a first protecting member;

a passage formed in the second pressure introducing passage and connected to the rear surface is filled with a second protecting member to prevent foreign particles from entering into the passage;

the semiconductor sensor chip includes a cavity having an opening open to the rear surface and a diaphragm formed on the front surface at a bottom side of the cavity opposite to the opening;

the rear surface of the sensor chip is attached to a substrate, which in turn is connected to the case, the substrate having a through-hole for introducing the second pressure, a cross-sectional area of the through-hole being smaller than that of the opening of the cavity;

the through-hole is filled with the second protecting member;

the passage formed in the second pressure introducing passage includes a pressure passage connected to the through-hole and a depressed portion connected to the pressure passage, the depressed portion having an opening larger than the pressure passage;

both of the pressure passage and the depressed portion are filled with the second protecting member; and the opening of the depressed portion is more than two times larger than the pressure passage.

2. A pressure sensor comprising:

a case;

a semiconductor sensor chip having a front and a rear surface, the semiconductor sensor chip being mounted on the case by connecting the rear surface to the case and measuring a difference between a first pressure applied to the front surface and a second pressure applied to the rear surface;

a first pressure introducing passage formed in the case, through which the first pressure is applied to the front surface; and a second pressure introducing passage formed in the case, through which the second pressure is applied to the rear surface, wherein:

the front surface is covered with a first protecting member;

a passage formed in the second pressure introducing passage and connected to the rear surface is filled with a second protecting member to prevent foreign particles from entering into the passage;

the semiconductor sensor chip includes a cavity having an opening open to the rear surface and a diaphragm formed on the front surface at a bottom side of the cavity opposite to the opening;

the rear surface of the sensor chip is attached to a substrate, which in turn is connected to the case, the substrate having a through-hole for introducing the second pressure, a cross-sectional area of the through-hole being smaller than that of the opening of the cavity;

the through-hole is filled with the second protecting member;

the first pressure introducing passage extends in a direction perpendicular to the front surface of the semiconductor sensor chip, forming a funnel-shaped passage;

the funnel-shaped passage includes: a rectangular space directly facing the front surface of the semiconductor sensor chip; a tapered space having a wider cross-section and a narrower cross-section, the wider cross-section being connected to the rectangular space; and a pressure port connected to the narrower cross-section of the tapered space; and the tapered space has a taper angle larger than 30 degrees relative to the front surface of the semiconductor sensor chip.

3. The pressure sensor as in claim 2 wherein:

the taper angle is larger than 45 degrees.

4. A pressure sensor comprising:

a case;

a semiconductor sensor chip having a front and a rear surface, the semiconductor sensor chip being mounted on the case by connecting the rear surface to the case and measuring a difference between a first pressure applied to the front surface and a second pressure applied to the rear surface;

a first pressure introducing passage formed in the case, through which the first pressure is applied to the front surface; and a second pressure introducing passage formed in the case, through which the second pressure is applied to the rear surface, wherein:

the front surface is covered with a first protecting member;

a passage formed in the second pressure introducing passage and connected to the rear surface is filled with a second protecting member to prevent foreign particles from entering into the passage;

the semiconductor sensor chip includes a cavity having an opening open to the rear surface and a diaphragm formed on the front surface at a bottom side of the cavity opposite to the opening;

the rear surface of the sensor chip is attached to a substrate, which in turn is connected to the case, the substrate having a through-hole for introducing the second pressure, a cross-sectional area of the through-hole being smaller than that of the opening of the cavity;

the through-hole is filled with the second protecting member;

oil is added to the first protecting member and the second protecting member; and an amount of oil added to the second protecting member is larger than that added to the first protecting member.

5. The pressure sensor as in claim 4, wherein:

the amount of oil added to the second protecting member is larger than 30 percent of a total amount of the second protecting member and the added oil.

6. The pressure sensor as in claim 4, wherein:

the second protecting member is either phlorosilicone gel or fluorine gel, and the oil added to the second protecting member is either phlorosilicone oil or fluorine oil.

7. A pressure sensor comprising:

a case;

a semiconductor sensor chip having a front and a rear surface, the semiconductor sensor chip being mounted on the case by connecting the rear surface to the case and measuring a difference between a first pressure applied to the front surface and a second pressure applied to the rear surface;

a first pressure introducing passage formed in the case, through which the first pressure is applied to the front surface; and a second pressure introducing passage formed in the case, through which the second pressure is applied to the rear surface, wherein:

the front surface is covered with a first protecting member; and a passage formed in the second pressure introducing passage and connected to the rear surface is filled with a second protecting member to prevent foreign particles from entering into the passage.

8. The pressure sensor as in claim 7 wherein:

the semiconductor sensor chip includes a cavity having an opening open to the rear surface and a diaphragm formed on the front surface at a bottom side of the cavity opposite to the opening;

the rear surface of the sensor chip is attached to a substrate, which in turn is connected to the case, the substrate having a through-hole for introducing the second pressure, a cross-sectional area of the through-hole being smaller than that of the opening of the cavity; and the through-hole is filled with the second protecting member.

9. The pressure sensor as in claim 8, wherein:

the passage formed in the second pressure introducing passage includes a pressure passage connected to the through-hole and a depressed portion connected to the pressure passage, the depressed portion having an opening larger than the pressure passage; and both of the pressure passage and the depressed portion are filled with the second protecting member.

10. The pressure sensor as in claim 8, wherein:

the first and the second protecting members are elastic members, and an elasticity modulus of the second protecting member is equal to or lower than that of the first protecting member.

11. The pressure sensor as in claim 8, wherein:

the second pressure introducing passage extends in a direction perpendicular to the rear surface of the semiconductor sensor chip, forming a funnel-shaped passage;

the funnel-shaped passage includes: a rectangular space directly facing the rear surface of the semiconductor sensor chip; a tapered space having a wider cross-section and a narrower cross-section, the wider cross-section being connected to the rectangular space; and a pressure port connected to the narrower cross-section of the tapered space; and the tapered space has a taper angle larger than 30 degrees relative to the rear surface of the semiconductor sensor chip.

12. The pressure sensor as in claim 11, wherein:

the taper angle is larger than 45 degrees.

* * * * *